Nov. 4, 1958     A. KRAUSS ET AL     2,858,799
AUTOMATIC FISH FEEDER

Filed Jan. 12, 1956     2 Sheets-Sheet 1

INVENTORS
Randolph Krauss
BY Alexander Krauss

ATTORNEY

Nov. 4, 1958
A. KRAUSS ET AL
2,858,799
AUTOMATIC FISH FEEDER
Filed Jan. 12, 1956
2 Sheets—Sheet 2
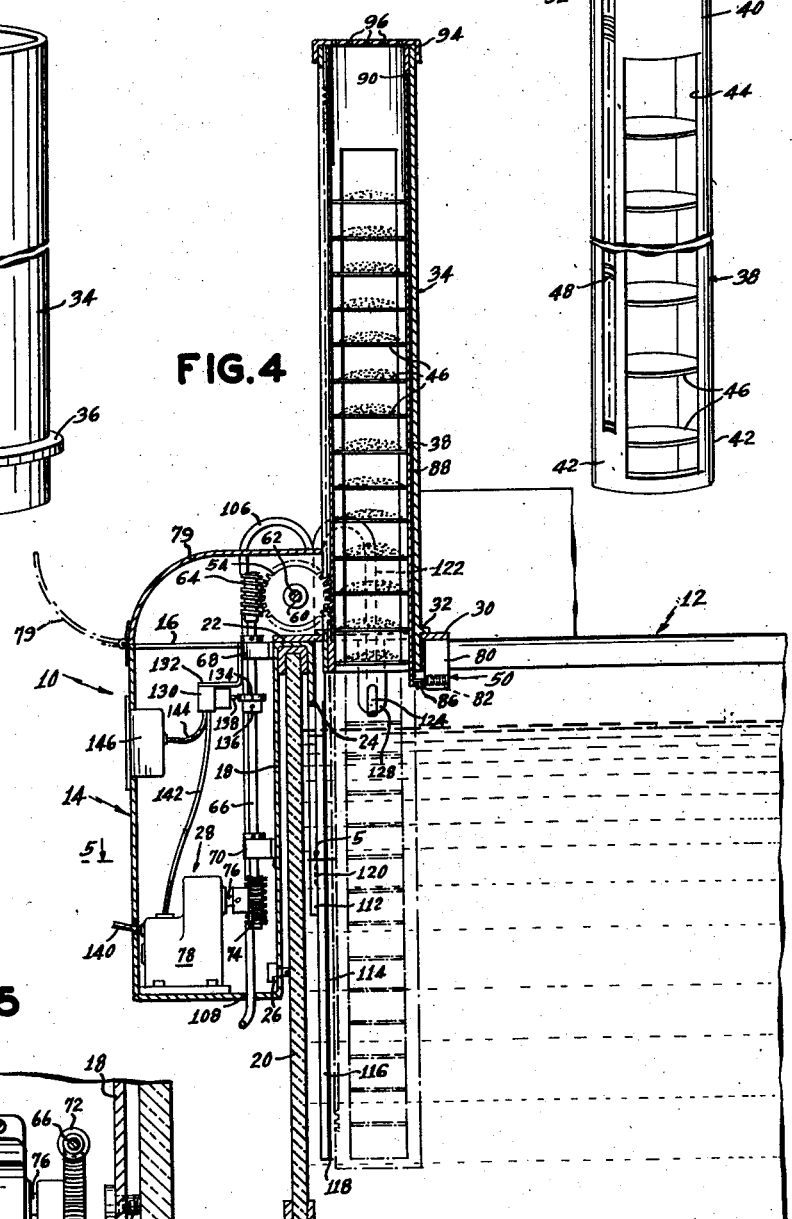
INVENTORS
Randolph Krauss
Alexander Krauss
BY
Trajan Cohen
ATTORNEY

2,858,799
AUTOMATIC FISH FEEDER

Alexander Krauss and Randolph Krauss,
New York, N. Y.

Application January 12, 1956, Serial No. 558,740

4 Claims. (Cl. 119—5)

This invention relates to an automatic feeding device and particularly to an automatic feeding device for captive fish and other animals in an aquarium or tank.

One object of the present invention is the provision of an automatic feeding device which is adapted to store food for a number of days and to deliver the food to the animals or fish periodically in predetermined amounts.

Another object of the present invention is the provision of an automatic fish feeder which supplies to fish in an aquarium a predetermined amount of food each day for a number of days, said feeding device having provision for controlling auxiliary apparatus associated with the aquarium whereby to operate said auxiliary apparatus from time to time.

As a general object, it is our intention to provide a generally new and improved automatic feeding device for use in home aquariums.

The above and other objects, characteristics and features of the present invention will be more fully understood from the following description taken in connection with the accompanying illustrative drawings.

In the drawings:

Fig. 4 is a sectional view taken along the line 4—4 of Fig. 2;

Fig. 5 is a sectional view taken along the line 5—5 of Fig. 4;

Fig. 6 is a perspective view of the outer or guide tube or cylinder from a part of the present invention;

Fig. 7 is a perspective view of the food container or inner tube or cylinder forming a part of the present invention.

Figure 1:
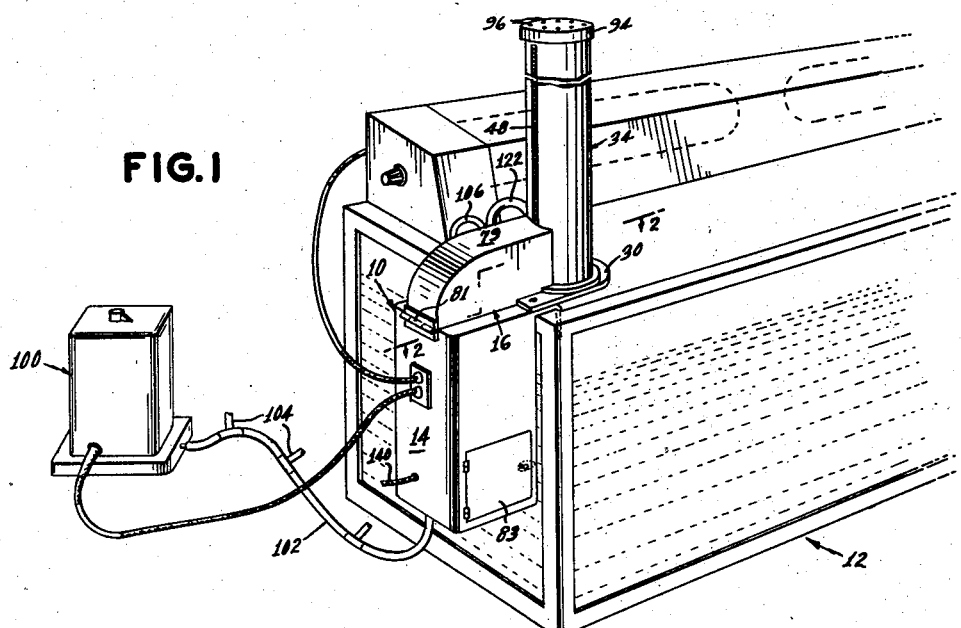
Fig. 1 is a perspective view of an aquarium having removably attached thereto a fish feeder embodying the present invention.
Figure 2:
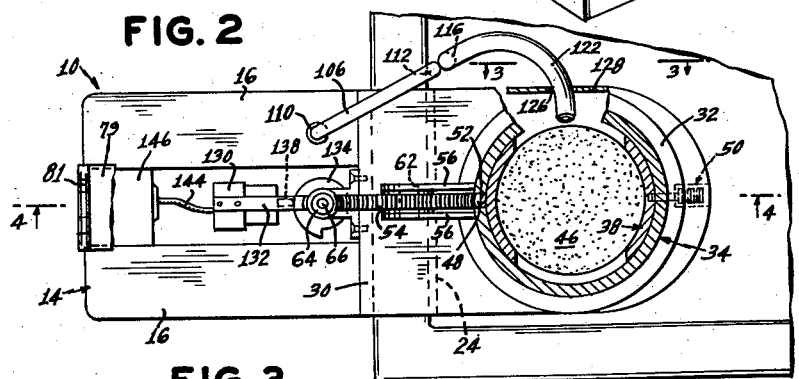
Fig. 2 is a sectional view taken along the line 2—2 of Fig. 1.

Referring now to the drawings in detail, a fish feeder 10 is shown in Fig. 1 as being releasably secured to an aquarium or fish tank 12. The fish feeder comprises a main housing 14 provided with an upper plate 16 which forms the top of the housing and which further extends beyond the rear wall 18 of the housing an amount which is at least as long as the thickness of the wall 20 of the aquarium. The portion 22 of plate 16 has a downwardly reflexed part 24 whereby housing wall 18 overhanging portion 22 and reflexed part 24 form a U-shaped bracket which is adapted to fit around the top of the aquarium wall so as to mount the housing 14 thereon. In this connection an extension 26 which may be made of rubber or plastic is secured to and carried by rear wall 18 of the housing 14 whereby to space the rear wall 18 from the aquarium wall 20. Enclosed within housing 14 is mechanism 28 for operating the fish feeder in a manner to be described hereinafter.

Secured to part 22 of upper plate 16 in any suitable manner such as by cementing, fusing, welding, or by the employment of suitable securing elements is a horizontal plate 30 which extends outwardly from housing 14 over the water in the aquarium 12. It is presently contemplated that the housing and plate 30 will both be made of plastic, preferably styrene, and in this event suitable cements are available for connecting the two parts together, or they may be molded as one integral part. Of course these parts may be made of any suitable material such as metal or wood. Plate 30 is provided with a relatively large aperture 32 which is adapted to receive an outer tube or cylinder 34. The tube or cylinder has substantially the same outside diameter as the diameter of aperture 32 so that the outer cylinder will be held relatively fast in said aperture. Outer cylinder 34 is provided with a flange 36, said flange being relatively close to but spaced from the bottom of the outer cylinder. Accordingly, when the bottom of the cylinder is inserted into the aperture 32, the flange will abut against plate 30 and thereby position the outer cylinder in operative relation on the plate. Slidably disposed within the outer cylinder 34 is an inner tube or cylinder 38 which serves as the feed carrier. Carrier 38 has a substantially cylindrical top portion 40 and two longitudinally extending arcuate legs 42 which may be defined in any suitable manner such as by cutting out portions of the cylinder to form relatively large slots 44. Of course, as will become more clear hereinafter, carrier 38 may be formed by molding and, in this regard, it is to be understood that both the iner and outer cylinders are preferably formed of plastic material such as Plexiglas, although other suitable plastic materials or metal or even wood may be employed to form the two cylinders. Secured to the legs 42 and extending transversely thereof are a plurality of shelves 46. Said shelves being spaced from one another and being disposed so that they extend transversely of the longitudinal axis of cylinder 38. Preferably, there will be fourteen shelves provided on the carrier 38, and, as will be understood more clearly hereinafter, each shelf is adapted to carry one day's supply of food, preferably of the dry type, for the fish in the aquarium. The shelves may be secured to the legs in any suitable manner such as by cementing them and, of course, if the inner tube or carrier 38 is molded the shelves will be formed integrally with the legs and the top of the tube.

In accordance with the present invention carrier 38 is slidably mountable within outer cylinder 34 and is movable longitudinally thereof by mechanism 28. The movement is in a downward direction and preferably at a speed of one shelf space per day. If is to be noted in this connection that the outer cylinder does not extend into the water in the aquarium and as the inner cylinder moves downwardly at the desired rate, one shelf per day will become immersed in the water in the tank whereby to cause the food to float off the shelf so immersed and thereby deposit it in the water from the fish to feed from. To effect the movement of the carrier or inner cylinder 38, the inner cylinder is provided with a rack 48 extending along one of the legs thereof. Rack 48 is preferably defined within the surface of the leg 42 as is shown in the drawings although it may be secured to said leg and extend outwardly from the periphery thereof. When the carrier 38 is disposed within outer cylinder 34, and is properly indexed therein by indexing or guide means 50 to be described in detail hereinafter the rack 48 will register with a longitudinally extending slot 52 defined in the outer cylinder 34.

Extending into the slot 52 for engagement with the rack 48 is a worm wheel 54 which may be mounted in any suitable manner for rotation so as to move carrier 38 downwardly in a longitudinal direction when the worm wheel 54 rotates. As shown herein worm wheel 54 is mounted on a pair of arms 56 which are secured to the wall of the outer cylinder 34 and extend laterally of the cylinder. The arms 56 are provided adjacent their free ends with apertures 58 which are in registry and the apertures 58 are adapted to register with an aperture 60 in the worm wheel 54 so as to permit the insertion of a pin or axle 62 for rotatably mounting the worm wheel on the arms 56. If desired the axle 62 may be removable or it may be fixedly positioned on the arms 56. To rotatably drive worm wheel 54 a worm 64 is provided in meshing relation with the worm wheel. Worm 64 is fixed to a rotatable axle or shaft 66 which is vertically mounted in bearings 68 and 70 for rotation. Fixed to the lower end of axle or shaft 66 is another worm 72 which is in meshing relation with a worm wheel 74 mounted on the output shaft 76 of a motor 78. Motor 78 is a continuously operating motor and it is believed obvious that when the motor 78 is operating it will rotate worm 74 to thereby impart rotary movement to axle 66 and worm 64 which in turn imparts rotary movement to worm wheel 54 to thereby drive the inner cylinder 38 downwardly relative to the fixed outer cylinder 34. As stated above the parts are preferably arranged to move the carrier downwardly one shelf space per day so as to immerse one shelf per day in the water and thereby feed the fish in the aquarium a predetermined amount of food once per day. In order to enclose worm wheel 54 and worm 64 to prevent accidental engagement therewith by the hands of a passing person, a cover 79 is preferably secured to the housing 14 as at 81 so that it may be moved into covering relation with the worm and worm wheel as shown best in Figs. 1 and 4 or to be moved to retracted position so as to permit disengagement of the worm from the worm wheel (see dotted position in Fig. 4). Furthermore, if desired casing 14 may be provided with an openable closure or door 83 to provide for access to the mechanism 28 within the enclosure for proper maintenance and repair thereof.

To properly index the carrier or inner cylinder 38 within the outer cylinder 34 so that the rack 48 registers with the slot 52, plate 30 is provided with a depending part 80 having a cavity 82 defined near the bottom thereof. Disposed in the cavity 82 is a spring 84 which biases a pin 86 to the left as viewed in Fig. 4. Pin 86 is disposed within a longitudinal slot 88 defined in the leg 42 of carrier 38 which is not provided with the rack 48 thereon. Slot 88 extends substantially the full length of the carrier 38 but terminates short of the upper end of the carrier at which point the slot is provided with a depression 90 which is of substantially the same diameter as pin 86.

In operation feed, preferably of the dry type, is normally placed upon the shelves 46 carried by the inner tube 38 and thereafter the inner tube is inserted into the outer tube. The inner tube is preferably slightly longer than the outer tube whereby to permit the inner tube to extend a small distance below the outer tube. With the parts so arranged, the outer tube is disposed within the aperture 32 in plate 30 so as to bring the worm wheel 54 into meshing relation with the worm 64. However in order to effect this meshing engagement of the gears the slot 88 must be so positioned that the pin 86 is disposed therewithin whereby the pin and slot prevent rotary movement of the carrier 38 relative to the outer tube 34. Motor 78 is then energized to commence driving the carrier downwardly as hereinbefore described and this movement will continue until the uppermost shelf has been immersed in the water in the tank. Rack 48 is arranged so that it terminates a short distance from the top of the cylinder 38 and the remaining length of cylinder is provided with a slot 92. When the carrier has moved downwardly sufficiently, the worm wheel 54 moves out of meshing relation with the rack 48 and becomes disposed in the slot 92 where it cannot effect any further movement of the inner tube. Accordingly, the inner tube is free to move downwardly under the influence of gravity without interference from the gears. As this downward movement commences, however, pin 86 moves into the depression 90 at the end of the slot 88 to thereby lock the inner cylinder against any further downward movement, and thereby preventing the cylinder from dropping off into the aquarium.

Since the movement of the carrier 38 is relatively slow, the feed on the shelves 46 will be positioned thereon for a relatively long time of the order of two weeks. In order to prevent contamination of the food by dust or similar foreign matter, a cap 94 may be removably positioned over the top of the outer cylinder whereby to prevent dust or other foreign matter from gaining access to the fish food. Preferably, the cap is provided with a number of small apertures 96 to permit air to pass into the cylinder 34 and thereby prevent any vacuum from being created by the movement of the carrier relative to the cylinder 34 which vacuum may cause a resistance to movement of the carrier.

Figure 8:
Fig. 8 illustrates in side section three forms of shelves for carrying food, said shelves to be mounted on the inner cylinder of the device.

The shelves 46 may take a number of different forms as shown in Fig. 8. For instance, the shelves may be flat disc-like members such as shelves 46A. This shelf is desirable since it is readily fabricated. The shelf may also take the form of a concave member such as 46B, which shelf may be readily loaded with food. Moreover, the shelf may be a substantially disc-like member provided with a small protrusion 98 such as is shown by the shelf designated 46C. We have found that a shelf such as shelf 46C is desirable since the tip 98 tends to break the surface tension created during the slow movement of the shelf into the water in the tank which surface tension tends to cake the food onto the shelf and prevent it from floating off so as to be accessible for the fish.

In order to obviate any possibility of the food sticking to the shelves 46 as has been mentioned above, means may be provided to remove the food from the shelf at the desired time. To accomplish this end, applicant employs a conventional air pump 100. Air pumps of the type herein contemplated are commonly employed in standard filtering systems in aquariums and are well known to people familiar with aquariums and their auxiliary equipment. Such a pump operates to supply compressed air out through a duct 102 having a number of outlets 104 which may be tapped to supply various filtering equipment employed with the aquarium. Duct 102 is releasably secured to a pipe 106 which is removably mounted on the casing 14 and extends therethrough through apertures 108 and 110 provided in the bottom and top plates of the housing 14. Pipe 106 is U-shaped and the leg 112 thereof extends into the water in the aquarium. Leg 112 is secured in any suitable manner to another pipe 114, the leg 116 thereof being connected to leg 112 and extending below the bottom of said leg 112. The end of leg 112 of pipe 106 is sealed at the bottom thereof as at 118 and the leg 116 of the pipe 114 is open at the bottom as at 118. Legs 112 and 116 of pipes 106 and 114, respectively, are each provided in their walls with apertures 120 which register to form a passage between the two pipes. Pipe 114 is also U-shaped and the other leg thereof, that is leg 122, is relatively short and has a bent end 124 which is disposed in an aperture 126 in a depending plate 128 which is secured to or integral with plate 30. The end 124 is positioned above the water level in the aquarium.

In operation when the pump 100 is supplying compressed air, the air passing through the passage 102 into tube 114 will cause water from the aquarium to be sucked up through tube 114 and forced out through the end 124 of said tube. The end 124 is directed at the shelves, and, accordingly, as each shelf moves into alignment with the end 124 it is subjected to a stream of water from the tube 114, the stream being effective to force or wash the food off the shelf. Although, as has been pointed out hereinbefore, the forced removal of the food from the shelf is not necessary, several highly desirable results flow from this feature of applicant's invention. First of all if the washing of the food off the shelves is employed a shelf such as 46B may be used thereby enabling a readily loadable shelf to be employed. Moreover, by using the food washing arrangement described above it is absolutely assured that food will be deposited at a predetermined time each day. This is not necessarily the case where the food is deposited into the aquarium by immersing the shelf in the aquarium water since the water level in the aquarium tends to drop a little bit each day due to evaporation. Accordingly, although the carrier 38 may move one shelf per day it is conceivable that the food may be deposited in the water once every 26 or so hours due to the evaporation causing a dropping of the water level.

In accordance with another highly desirable feature of the present invention, applicant's mechanism 28 for moving carrier 38 has provision for controlling other auxiliary apparatus for the tank. As is well known to fish fanciers the aquarium must be subjected to light for approximately six hours a day in order to maintain the plants in the aquarium in healthy condition. Moreover, the filter itself should operate for a portion of each day in order to keep the water in a clean condition. It is our present intention to enable fish fanciers employing our apparatus to be able to leave their aquarium for a prolonged period of time, for instance two weeks, and to be assured upon their return that the fish will have been fed and that the aquarium will be maintained in a generally normal condition without the necessity of any human attention. To accomplish this highly desirable result, applicant provides within casing 14 a microswitch or other suitable circuit controlling means 130 which is suitably mounted on a bracket 132 carried by the casing 14. Micro-switch 130 is operated by a cam 134 fixed to shaft 66 as by a set screw 136. Cam 134 is adapted to engage the microswitch contact actuator 138 to close the switch for a predetermined time interval. In furtherance of this result it is preferable that shaft 66 rotate at the rate of one revolution per day whereby to close the micro switch for a predetermined period once a day. The electrical conductor 140 which supplies motor 78 is tapped preferably within the motor housing by conductors 142 which lead to the micro switch 130. Conductors 144 lead out of the micro-switch to a suitable female outlet 146. The circuit is arranged so that power is supplied to the micro-switch 130 at all times and the micro switch operates to close or open the circuit including conductors 144 so as to supply energy to the female outlet 146 at given periods of time. The auxiliary apparatus such as the pump 100 and the lamp 148 are plugged into the female receptacle 146 so that they become energized and operable for said predetermined period of time during each day. It is our present intention to arrange cam 134 so that it closes micro switch 130 approximately two hours prior to food on the shelves 46 being deposited into the aquarium water. Accordingly the filtering system and the lamp will be operating for a period of two hours prior to the food being fed to the fish. It is our further intention to maintain the micro switch closed for approximately four hours after the feeding whereby to maintain the auxiliary apparatus operating for a period of approximately six hours a day which we have found will maintain the aquarium in proper condition.

Of course, it is obvious that other sequences and times of operation may be selected and our invention is not limited to the example given above. However, it is believed highly desirable that the pump 100 commence operating prior to the time that the food is to be deposited into the aquarium, particularly when the forced removal of the food from the shelves is employed since it is believed obvious that the forced feeding cannot be accomplished without the pump 100 operating. Moreover, it will also be obvious that other types of time controlled means may be employed in the present apparatus without departing from the spirit and scope of the present invention.

Figure 3:
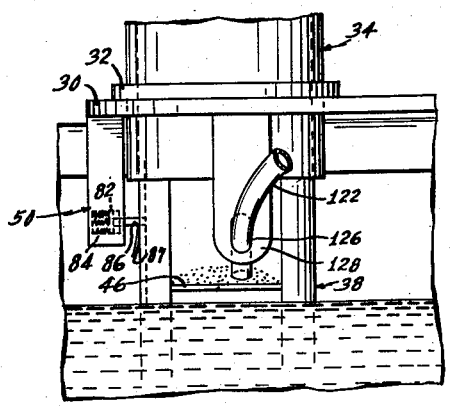
Fig. 3 is a sectional view taken along the line 3—3 of Fig. 2.

It is believed obvious that when it is desired to reload the carrier 38 with food, tube 34 is moved upwardly of aperture 32 and carrier 38 to disengage tube 34 from plate 30. Thereafter, the carrier can be disengaged from pin 86 of indexing means 50 by moving pin 87 to the left, as viewed in Fig. 3, to remove it therefrom for reloading. Thereafter, the reloaded carrier 38 can be reinserted into tube 34, the worm wheel 54 not interfering with the movement because it is freely rotatable. The two tubes, as a unit are then reinserted in aperture 32 and the gears 54—64 are brought into mesh as by a small turning movement of the tubes which may be permitted by the indexing means 50, and the apparatus is again ready to operate. In this connection, it is to be noted that the reloading operation is greatly facilitated by the worm wheel 54 being carried by the cylinder 34 to thereby prevent obstruction of movement of the two tubes as a unit or separately as the case may be.

Although we have shown and described the preferred embodiment of our invention, it will be understood that various changes and modifications may be made therein within the scope of the appended claims without departing from the spirit and scope of this invention.

Having thus described my invention, what I claim and desire to secure by Letters Patent, is:

1. An automatic feeder for fish in an aquarium, comprising a housing adapted to be releasably connected to a side wall of the aquarium, an outer vertically extending tubular members, means carried by said housing and releasably connected to said outer member for holding the latter over the water in said aquarium when said housing is connected to a side wall thereof, another member disposed within said outer member and being longitudinally movable relative thereto, said other member comprising a plurality of substantial horizontal spaced shelves adapted to carry food thereon, motor means within said housing, and means operatively connecting said motor means to said other member for moving the latter downwardly relative to said outer member whereby to successively remove said shelves from within said outer member to condition said shelves for depositing food carried thereon into said aquarium to feed the fish therein.

2. An automatic feeder for fish in an aquarium, comprising a housing adapted to be releasably connected to a side wall of the aquarium, an outer vertically extending tubular member, means carried by said housing and releasably connected to said outer member for holding the latter over the water in said aquarium when said housing is connected to a side wall thereof, another member disposed within said outer member and being longitudinally movable relative thereto, said other member comprising a plurality of substantially horizontal spaced shelves adapted to carry food thereon, motor means within said housing, and means operatively connecting said motor means to said other member for moving the latter downwardly relative to said outer member whereby to successively remove said shelves from within said outer member to condition said shelves for depositing food carried thereon into said aquarium to feed the fish therein, and control means operable in timed relation with the movement of said other member, said control means being adapted to automatically control auxiliary apparatus associated with the aquarium.

3. An automatic feeder for fish in an aquarium, comprising a housing adapted to be releasably connected to a side wall of the aquarium, an outer vertically extending tubular member, means carried by said housing and releasably connected to said outer member for holding the latter over the water in said aquarium when said housing is connected to a side wall thereof; another member disposed within said outer member and being longitudinally movable relative thereto, said other member comprising a plurality of substantially horizontal spaced shelves adapted to carry food thereon, motor means within said housing, and means operatively connecting said motor means to said other member for moving the latter downwardly relative to said outer member whereby to successively remove said shelves from within said outer member, switch means disposed within said housing, cam means driven by said motor means for operating said switch means, a pump adapted to operate the filtering system for said aquarium, a tube having an outlet disposed below said outer tube and directed at said shelves, said tube being operatively connected to said pump whereby when said pump operates fluid is ejected from said outlet and directed at said shelves to remove the food therefrom and deposit it into the aquarium, said switch means controlling said pump.

4. An automatic feeder for fish in an aquarium, comprising an outer vertically extending tubular member, another member disposed within said outer member and being longitudinally movable relative thereto, said other member comprising a plurality of substantially horizontal spaced shelves adapted to carry food thereon, relative longitudinal movement between said members being effective to successively expose said shelves whereby to condition the food thereon for depositing into the aquarium to feed the fish therein, and means for moving said other member longitudinally of said outer member comprising a longitudinally extending rack on said other member and a complementary rotatable gear carried by said outer member, said outer member having a longitudinal slot defined therein through which said gear extends to engage said rack, whereby said outer and other members can be moved as a unit, and means for rotating said gear whereby to impart longitudinal movement of said other member relative to said outer member.

References Cited in the file of this patent

UNITED STATES PATENTS

| | | |
|---|---|---|
| 848,101 | Hale | Mar. 26, 1907 |
| 1,989,298 | Tingley | Jan. 29, 1935 |
| 2,120,566 | Matter | June 14, 1938 |
| 2,180,647 | Steinbiss | Nov. 21, 1939 |
| 2,271,937 | Engels | Feb. 3, 1942 |
| 2,533,936 | Holmes et al. | Dec. 12, 1950 |
| 2,585,371 | Coffing | Feb. 12, 1952 |
| 2,725,852 | Cramer | Dec. 6, 1955 |